US009950497B2

(12) United States Patent
Doux et al.

(10) Patent No.: US 9,950,497 B2
(45) Date of Patent: Apr. 24, 2018

(54) COMPOSITE METAL AND POLYMER PART

(75) Inventors: Marjolaine Doux, Paris (FR); Didier Verchere, Lamorlaye (FR)

(73) Assignee: ARCELORMITTAL INVESTIGACION Y DESARROLLO, Sestao Bizkaia (ES)

(*) Notice: Subject to any disclaimer, the term of this patent is extended or adjusted under 35 U.S.C. 154(b) by 201 days.

(21) Appl. No.: 13/376,548

(22) PCT Filed: Jun. 8, 2010

(86) PCT No.: PCT/FR2010/000418
§ 371 (c)(1),
(2), (4) Date: Dec. 6, 2011

(87) PCT Pub. No.: WO2010/142868
PCT Pub. Date: Dec. 16, 2010

(65) Prior Publication Data
US 2012/0094133 A1    Apr. 19, 2012

(30) Foreign Application Priority Data
Jun. 8, 2009    (WO) ............... PCT/FR2009/000674

(51) Int. Cl.
| B32B 15/08 | (2006.01) |
| B32B 25/08 | (2006.01) |
| B32B 27/20 | (2006.01) |
| B32B 27/08 | (2006.01) |
| B32B 25/02 | (2006.01) |
| B32B 15/06 | (2006.01) |
| B32B 7/12 | (2006.01) |
| B32B 27/32 | (2006.01) |
| B32B 27/18 | (2006.01) |
| B32B 15/18 | (2006.01) |

(52) U.S. Cl.
CPC ............ *B32B 15/08* (2013.01); *B32B 7/12* (2013.01); *B32B 15/06* (2013.01); *B32B 15/18* (2013.01); *B32B 25/02* (2013.01); *B32B 25/08* (2013.01); *B32B 27/08* (2013.01); *B32B 27/18* (2013.01); *B32B 27/20* (2013.01); *B32B 27/32* (2013.01); *B32B 2255/06* (2013.01); *B32B 2264/10* (2013.01); *B32B 2270/00* (2013.01); *B32B 2307/30* (2013.01); *B32B 2307/546* (2013.01); *B32B 2307/714* (2013.01); *B32B 2307/734* (2013.01); *B32B 2605/00* (2013.01); *Y10T 156/1041* (2015.01); *Y10T 428/31696* (2015.04)

(58) Field of Classification Search
CPC ......... B32B 15/08; B32B 15/18; B32B 27/18; B32B 27/32; B32B 7/12; B32B 15/06; B32B 25/02; B32B 25/08; B32B 27/08; B32B 27/20; B32B 2255/06; B32B 2264/10; B32B 2270/00; B32B 2307/30; B32B 2307/546; B32B 2307/714; B32B 2307/734; B32B 2605/00; Y10T 156/1041; Y10T 428/31696
See application file for complete search history.

(56) References Cited

U.S. PATENT DOCUMENTS

| 4,229,504 | A |   | 10/1980 | Brachman |
| 5,155,153 | A | * | 10/1992 | Neri et al. ................ 524/101 |
| 5,837,360 | A | * | 11/1998 | Takano et al. ............. 428/216 |
| 8,217,116 | B2 | * | 7/2012 | Doufas ...................... 525/191 |
| 2003/0146542 | A1 | * | 8/2003 | Fatnes et al. .............. 264/310 |
| 2007/0186614 | A1 |   | 8/2007 | Pinard |
| 2008/0085977 | A1 | * | 4/2008 | Okamoto et al. .......... 525/240 |
| 2009/0298978 | A1 |   | 12/2009 | Rotzinger |
| 2010/0286310 | A1 | * | 11/2010 | Lederer et al. ............ 523/455 |

FOREIGN PATENT DOCUMENTS

| EP | 0 598 428 | A1 |   | 5/1994 |
| EP | 0 609 569 | A2 |   | 8/1994 |
| EP | 1249471 |   | * | 7/1997 |
| FR | 2866592 | A1 |   | 2/2004 |
| FR | 2 866 592 |   |   | 8/2005 |
| JP | 05269858 | A |   | 10/1993 |
| JP | 07133389 | A |   | 5/1995 |
| JP | 09217048 | A |   | 8/1997 |
| JP | 2003012826 | A |   | 1/2003 |
| JP | 2006290157 | A |   | 10/2006 |
| NZ | 284655 | A |   | 8/1999 |
| RU | 2149102 | C1 |   | 5/2000 |
| SU | 1020253 | A1 |   | 5/1983 |
| SU | 1147598 | A1 |   | 3/1985 |
| WO | WO 97/28213 | A1 |   | 8/1997 |
| WO | 2005123822 |   | * | 12/2005 |
| WO | 2006063957 | A1 |   | 6/2006 |
| WO | WO 2006/063957 | A1 |   | 6/2006 |

OTHER PUBLICATIONS

Bruno Rotzinger, "Talc-filled PP: A new concept to maintain long term heat stability", Polymer Degradation and Stability, vol. 91, No. 12, XP025095941, Dec. 1, 2006, pp. 2884-2887.

* cited by examiner

Primary Examiner — Kevin R Kruer
(74) Attorney, Agent, or Firm — Davidson, Davidson & Kappel, LLC; Jennifer L. O'Connell; William C. Gehris

(57) ABSTRACT

The invention relates essentially to a composite part comprising at least one sheet of steel coated with at least one polymeric film formed beforehand by extrusion of a polymeric blend comprising at least the following components:
  a polymer formed of a dispersion of elastomer nodules in a polypropylene matrix, the proportion of elastomer in the matrix being less than 20% by weight of the combination formed by the matrix and the elastomer,
  a first antioxidant from the family of the phenolic antioxidants for a content by weight of greater than or equal to 0.2%,
  a second antioxidant from the family of the hydroperoxide-decomposing antioxidants for a content by weight of greater than or equal to 0.1%,
  reinforcing fillers for a content by weight of less than 10%.

The invention relates in addition to a process for the manufacture of this composite part and to the application of this composite part in the motor vehicle and transportation fields.

18 Claims, No Drawings

COMPOSITE METAL AND POLYMER PART

This application is a national stage filing of International Application No. PCT/FR2010/000418, filed on Dec. 6, 2011, which claims priority from International Application No. PCT/FR09/00674, filed on Jun. 8, 2009.

FIELD OF THE INVENTION

The invention relates to a composite metal and polymer part, to its process of manufacture and to its use in particular in the field of motor vehicles and transportation.

BACKGROUND OF THE INVENTION

Composite parts make it possible to contribute to the lightening of motor vehicle structures.

It is known, in particular from the patent FR 2 866 592, to manufacture, for this purpose, a part comprising a sheet of steel covered with one or more adherent films of polymer with a thickness of at least 0.1 millimeter. This part, basically in the coil form, has to be able to withstand all the processing stages (handling, cutting, bending, embossing, piercing, and the like).

DETAILED DESCRIPTION OF THE INVENTION

Furthermore, these parts absolutely have to withstand the passage through cathodic electrocoating and the application of all the layers of paint on the face on the steel side. Thus, the entire process of motor vehicle painting is transferrable to this composite, as on a conventional metal surface, with the same paints and the same thicknesses, and thus in the end with the same painted appearance. Electrocoating is an industrial painting technique, employed in particular in the motor vehicle industry, which consists essentially in immersing the part in a bath of paint by making the part a cathode and by causing the particles of paint in suspension in the bath to migrate by means of an electric current. Subsequently, the paint is cured in an oven.

Consequently, the part thus has to be able to withstand passage through an atmosphere at a temperature of between 150 and 210° C. for approximately 30 minutes and must not exhibit regions of shrinkage, flow, creep or internal stresses which may result in cracking, splitting, deformation or delamination between the metal and the polymer. Its thermal stability has to be sufficiently high to be resistant during the stages of surface preparation and of surface treatment of the metal and all the stages of curing the various layers of paint. The curing cycle for the electrocoating layer is the most severe for the polymer in comparison with the other curing cycles for the layers of paint: the primer, the base coat and the clear coat.

Furthermore, the manufacture of this part has to be compatible with the line outputs and in particular the galvanizing line output or the coating line output, also known as the strip coating line output. This supposes that the polymer film is high in thickness (typically 300 µm) and is provided in the form of a very broad coil (typically 1.5 m) in order to be colaminated on the sheet of steel at rates which can range up to 180 m/min.

Finally, in service on a motor vehicle, the part has to withstand variations in temperature ranging from −40° C. to 80° C.

It is known, from the patent U.S. Pat. No. 4,229,504, to resort to a polymer comprising from 10 to 70% of inorganic fillers and from 30 to 90% of a mixture itself composed of from 50 to 75% of a polyolefin and from 25 to 50% of an elastomer. This polymer, in combination with a metal facing, does not creep during the electrocoating stage. However, the high proportions of elastomer and of inorganic fillers necessary for the creep strength damage the mechanical properties of the polymer, such as its stiffness and its elongation, and also prevent the manufacture of homogeneous and very broad films by extrusion.

The aim of the invention is to overcome the disadvantages of the prior art by providing a polymeric blend which can be extruded in a form compatible with the process for the manufacture of the composite part and a composite part which withstands the electrocoating stage.

To this end, the composite part of the invention comprises at least one sheet of steel coated with at least one polymeric film formed beforehand by extrusion of a polymeric blend comprising at least the following components:
  a polymer formed of a dispersion of elastomer nodules in a polypropylene matrix, the proportion of elastomer in the matrix being less than 20% by weight of the combination formed by the matrix and the elastomer,
  a first antioxidant from the family of the phenolic antioxidants for a content by weight of greater than or equal to 0.2%,
  a second antioxidant from the family of the hydroperoxide-decomposing antioxidants for a content by weight of greater than or equal to 0.1%,
  reinforcing fillers for a content by weight of less than 10%.

The composite part of the invention can also comprise the following optional characteristics, taken in isolation or in combination:
  the proportion of elastomer in the matrix is between 8 and 20% by weight of the combination formed by the matrix and the elastomer,
  the first antioxidant is present in the polymeric blend at a level of 0.2% and the second antioxidant is present in the polymeric blend at a level of 0.1%,
  the fillers are microtalc,
  the composite part additionally comprises a polymeric layer of functionalized polyolefin on the underside of the polymeric film,
  the polymeric film is covered with a polymeric layer of functionalized polyolefin,
  the composite part additionally comprises, between the sheet of steel and the polymeric film, a primer applied to the sheet of steel and/or an adhesive applied to the primer.

The invention also relates to a process for the manufacture of the composite part, essentially characterized in that it comprises at least one stage of extrusion of the polymeric blend in the form of a film and one stage of colamination of the polymeric film obtained on the sheet of steel, optionally covered with a primer and with an adhesive. The polymeric blend is optionally coextruded with the polymeric layer of functionalized polyolefin.

Finally, the invention relates to the use of the composite part of the invention described above in the motor vehicle field.

The use of the composite part of the invention may also comprise the following optional characteristics, taken in isolation or in combination:
  the composite part is shaped by embossing, stamping, hydroforming or forming,
  the composite part is used for the manufacture of parts by overmolding.

In all of the text, the term "sheet of steel" will be understood as meaning a steel substrate optionally covered with a metal coating by galvanization or electrodeposition and optionally covered with a surface treatment, such as a conversion treatment.

A better understanding of the invention will be obtained on reading the following description:

Surprisingly, it has been found, by the inventors, that the combination of a polymer formed of a dispersion of elastomer nodules in a polypropylene matrix and of small amounts of antioxidants and of inorganic fillers, such as microtalc, makes it possible to obtain, on the one hand, a polymeric blend which can be extruded in the form of a very thick and very broad film and, on the other hand, a composite part which withstands the electrocoating stage.

The polymeric blend is based on a polypropylene matrix which offers the best compromise in properties of use (mechanical, insulating and soundproofing), cost and environmental impact (reduction in weight, decrease in the volatile organic compounds released). This matrix can be composed of just one polypropylene or of a blend of several polypropylenes. Preferably, recourse will be had to an isotactic polypropylene with a weight-average molar mass of approximately 400 000 g/mol and with an MFI (melt flow index) of approximately 2, which contributes to the strength of the polymeric film at −40° C.

An elastomer is added to this matrix in proportions ranging from 8 to 20% by weight of elastomer in the polypropylene matrix. This elastomer can be, for example, an EPR (ethylene/propylene rubber) or an EPDM (ethylene/propylene/diene terpolymer). It is introduced into the polypropylene matrix in the form of a dispersed phase, which means that elastomer nodules are uniformly distributed in the polypropylene matrix.

These elastomer nodules act as concentrator of stress, which halts the propagation of the cracks. The addition of elastomer makes it possible in this case to change from a brittle failure mode to a ductile failure mode.

The resistance to cold of the polymeric film is considered to be insufficient below 8% by weight of elastomer in the matrix. Above 20% of elastomer, the dispersion of the elastomer nodules in the polypropylene matrix deteriorates and the elastomer begins to dissolve in the matrix and plasticizes the latter. This plasticization is particularly damaging as it results in a loss in the stiffness of the polymeric film.

Preferably, recourse will be had to EPR in proportions of between 14 and 17%, which exhibits the best compromise between the resistance to cold performance of the polymeric film and the quality of the dispersed phase.

The polymeric blend according to the invention is subjected to three successive phases of high thermal stresses, which are the extrusion, the electrocoating stage and the service phase throughout the lifetime of the vehicle. In order to minimize damage to the polymeric blend during these three phases, this blend incorporates additional additives.

First, in order to avoid damage during the extrusion and the electrocoating stage, the polymeric blend comprises a blend of two antioxidants. The first antioxidant belongs to the family of the phenolic antioxidants. This first antioxidant will act mainly during the extrusion of the polymeric blend by preventing oxidation of the second antioxidant.

The second antioxidant belongs to the family of the hydroperoxide-decomposing antioxidants. It will, inter alia, have a role on the temperature stability of the polymeric film during the electrocoating.

The distinctiveness of this blend is due to a synergy between these two antioxidants which allows the polymeric film prepared, based on a polymer which alone does not withstand electrocoating, to get through this operation without damage or regions of shrinkage or of stresses in the organic film which may result in delamination between the metal and the polymer.

This synergistic effect is valid only for specific respective amounts of these two antioxidants in the polymeric blend, namely a minimum of 0.2% by weight of the polymeric blend for the first antioxidant and a minimum of 0.1% by weight of the polymeric blend for the second antioxidant.

Tests carried out with identical percentages of 0.1% by weight of the polymeric blend for the two antioxidants have shown that the resulting composite part does not get through electrocoating.

The choice will preferably be made, as first antioxidant, of pentaerythritol tetrakis(3-(3,5-di(t-butyl)-4-hydroxyphenyl)propionate), sold under the Irganox® and Ethanox® trade names.

The choice will preferably be made, as second antioxidant, of an aromatic phosphite and more specifically of tris(2,4-di(t-butyl)phenyl) phosphate, sold under the Ethaphos® trade name.

Secondly, throughout the lifetime of a car, the polymer must deteriorate as little as possible. Thus, it is preferable for this polymer, in addition to its temperature stability, to be completely resistant under the influence of the environment: thermal-chemical aging (high temperatures), thermal-oxidative aging (temperature and oxygen), chemical aging in a liquid medium (water, chemical reactants (salt, projection of dirty and corrosive mud, gasoline, oil, and the like)). Furthermore, it is also desirable for the composite to withstand, in service, weather changes (−40° C. to +80° C.), as explained above, and mechanical attacks (gravel, grocery cart impacts).

To this end, reinforcing fillers are also added to the polymeric blend for a percentage by weight of less than 10%. Above 10%, the fillers detrimentally affect the elongation at break of the polymeric film and their hardness tends to mark the surface of the composite parts shaped, giving this surface a quality unsuitable for use of the composite part in the motor vehicle sector.

These fillers make it possible in particular to be able to reduce the amount of antioxidants present in the polymeric blend while benefiting from the synergistic effect described above and thus to avoid excessively modifying the properties of the polymer. The fillers increase the thermal resistance and the mechanical strength and they confer, on the polymeric film, a satisfactory impact strength at −40° C. and also a good stiffness at +80° C.

Furthermore, the fillers contribute substantially to minimizing the shrinkage of the polymeric film during the electrocoating phase. These fillers act as crosslinking points, improving the stability of the amorphous chains, and as concentrators of stress. They thus improve the dimensional stability of the polymeric film.

Use may be made of known fillers of any type (inorganic, organic, metallic), for example dolomite, calcium carbonate, magnesium carbonate, lime, quartz, boron nitride, zinc sulfide, kaolin, wollastonite, titanium dioxide, silica, montmorillonite (nanoclay), glass beads, glass fibers, carbon fibers, talc, mica, carbon black, lamellar graphite, carbon nanotubes, stainless steel fibers, metal phosphides, polyamide fibers and cellulose fillers.

Use is preferably made of microtalc, which comprises platelets with a size of less than a micron. It is sold in particular in the masterbatch granular form (masterbatch based on polypropylene and microtalc) by Multibase, Dow Corning group. The microtalc in the masterbatch granular form is advantageous in that it makes it possible to obtain a very good dispersion in the polymeric blend and thus, in the end, a very good surface appearance. Furthermore, with only between 2 and 9% by weight of microtalc, the polymeric film retains its elongation, its appearance and its flexibility, while greatly enhancing the mechanical properties of the polymer film. This percentage of microtalc also facilitates the extrusion of the film, by slightly increasing the viscosity of the polymeric blend. On the other hand, above 10%, the fillers, which are very hard, result in premature wearing of the extrusion devices.

Furthermore, during the stage of extrusion of the film, at the extrusion temperature of the polypropylene, there does not appear any chemical interaction or incompatibility between the antioxidants and the microtalc which may result in damage to the film or a change in its semicrystalline structure or a loss in its properties or in its appearance or in its durability.

Furthermore, recourse to microtalc significantly reduces the shrinkage of the polymeric film during the electrocoating stage, in comparison with other fillers. This is because this microtalc is in the form of platelets which become oriented in the direction of the extrusion. These platelets thus more effectively counter the shrinkage and render the latter homogeneous in the two transverse and longitudinal directions of extrusion.

In addition, it is possible to provide for the introduction of conductive fillers (spherical or lamellar or needle or fiber) into the polymeric blend in order to render the polymeric film conductive and thus capable of receiving a paint (liquid or as a powder) deposited electrolytically or electrostatically.

Independently of its use in the motor vehicle sector, the polymeric film has to adhere in optimized fashion to the sheet of steel.

For this, provision is made to apply, to the sheet, for example on departing from the galvanizing bath, a surface treatment and an organic primer deposited by coating (for coating line). The technology employed on coating lines for flat bar steel consists in applying the anticorrosive primer to the roll. This organic primer, conventionally between 6 and 10 microns, ensures that the metal is protected and the adhesion between the metal and the organic layers is perfect. Furthermore, this primer has to be extremely flexible in order to allow the composite to be shaped. The primers are conventionally mixtures based on polyester resin which crosslink in the presence of curing agent of melamine and/or isocyanate type. These primers also have inorganic pigments and corrosion inhibitors. In the context of this composite, the use of an extremely flexible primer, basically with very high molar masses, with extreme metal/polymer adhesion, is favored. At the level of the composite, due to the sacrificial role of the metal coating, also due to the chromium-free surface treatment (conversion treatment) and to the primer, the edge corrosion is found to be greatly minimized.

This primer can be covered with an adhesive. This adhesive is also applied to the rolls by coating, conventionally between 3 and 20 µm; it absolutely has to form a continuous film when the conditions of the industrial line are applied (line speed up to 180 m/min). This adhesive can be of the family of the epoxides but also of the family of the polyesters. It will equally have to be selected due to its perfect compatibility with the primer and the polypropylene but also, of course, due to its absence of shrinkage during the curing of the composite. By virtue of the adhesive, the adhesion of the polymeric film to the sheet of steel is improved. The choice may be made, as adhesive, of the Morad® adhesive from Rohm & Haas or the reference adhesive FL200 or HL 406, which are sold by Kommerling.

Alternatively, it is also possible, while remaining within the context of the invention, to provide for the replacement of the adhesive and/or the primer by an adherent polymeric layer composed of a polyolefin functionalized so as to render it polar and thus adherent between the sheet of steel and the polymeric film, this layer ensuring that the polymeric film adheres to the sheet of steel. This adherent layer will either be deposited directly on the metal or will be coextruded with the polymeric blend according to the invention. However, this polymeric layer will itself also have to withstand passing through electrocoating and the other requirements necessary in the motor vehicle field. The choice will preferably be made, for this purpose, of a polypropylene grafted with maleic anhydride.

The polymeric film is preferably manufactured according to a conventional extrusion process. The polymer, the antioxidants and the fillers are introduced in the form of granules into the temperature-regulated cylindrical barrel, inside which rotates an endless screw which kneads the granules and transports them to a die in order to obtain a homogeneous molten-route blend. The die then confers, on the plastic mass, the shape of a film with a thickness of approximately 300 micrometers which is applied to the sheet of steel, optionally coated with the primer and, if appropriate, with the adhesive or the adherent layer of grafted polypropylene.

The composite part is then obtained which, for motor vehicle applications, will subsequently be shaped, for example by embossing, and subjected to painting (phosphating, electrocoating, deposition and curing of all the layers of paint). The part can also be cut, pierced and assembled by screwing, or welding with other thermoplastics by ultrasound. The polymer film will be homogeneous, with a perfect appearance, in order not to contribute any mark during the shaping of the composite. It should be noted in particular that the composite part according to the invention has the advantage of being formed of a thermoplastic polymeric film compatible with the overmolding process consisting in molding plastic over or around a part.

It is also possible to provide for the polymeric face of the composite part to be compatible with the adhesives and the mastics of the motor vehicle sector. This is because it is important, for the production of some motor vehicle parts, such as, for example, door sill plates, for structural or semistructural adhesives, mastic sealants or adjusting mastics, which are of varied chemical nature, such as epoxy, polyurethane and rubber, to adhere to the polymeric face.

The polypropylene matrix used in the context of the invention is of a chemical nature which does not make possible adhesion of adhesives and mastics. In order to overcome this disadvantage, it is possible either to functionalize the matrix or to deposit, on the polymeric film, an adhesive layer compatible, on the one hand, with the polypropylene, and, on the other hand, with the adhesives and mastics of the motor vehicle sector.

Recourse will preferably be had to an adhesive layer comprising a polyolefin functionalized by means of polar functional groups, such as acrylates and maleic anhydride. This adhesive layer will either be deposited directly on the polymeric film, for example by colamination or by coating, or be coextruded with the polymeric blend according to the invention. It will preferably have a thickness of between 30 and 100 μm. Recourse will preferably be had to a layer of polypropylene grafted with maleic anhydride, such as Priex® 25050 sold by Addcomp.

Finally, a significant advantage of the composite part of the invention should be noted, which advantage lies in the fact that the adhesion between the metal and the polymer is so good that thus this composite may be recyclable; it thus withstands grinding and shredding.

In order to illustrate the invention, tests have been carried out and will be described as nonlimiting examples.

Tests

The Young's modulus and the elongation at break are measured according to the standard ASTM D368 with test specimens of M-II type formed of the polymeric film alone, for a test rate of 50 mm/min and at 23° C. The Young's modulus E must be greater than 1000 MPa and the elongation at break must be greater than that of the steel used.

The adhesion of the polymeric film to the sheet of steel is evaluated by means of a standardized peel test (ISO11339). Starting from test specimens of 200 mm×25 mm, the end of the polymeric film is introduced into a grip of a tensile testing device, on the one hand, and the end of the metal is introduced into the second grip, on the other hand. The force necessary for the peeling of the film for a rate of displacement of the grips of 100 mm/min is indicative of the adhesion of the film. The adhesion of the film is considered to be sufficient when the peel strength exceeds 2 daN/cm. This test is carried out, on the one hand, on test specimens aged at ambient temperature and, on the other hand, on test specimens which have been subjected to a cathodic electrocoating stage, namely maintenance at 175° C. for 30 min.

The shrinkage of the polymeric film during the electrocoating stage is evaluated by subjecting a small cup, obtained by the embossing of a composite part, to a temperature of 210° C. for 45 min. A disk with a diameter of 150 mm is cut out from a composite part and then embossed using a punch at 25 mm/min, so as to achieve the depth of 50 mm. After spending 45 min at 210° C., the possible shrinkage of the film is measured manually at the collar of the small cup. The shrinkage of the polymeric film must be less than 2 mm at any point of the collar.

The temperature stability of the polymeric film is evaluated by a creep test, a composite part being exposed vertically to a temperature of 210° C. for 30 min. The temperature stability of the film is satisfactory if creep is absent.

The resistance to cold of the polymeric film is evaluated by subjecting a composite part maintained at −40° C. to the impact of a steel ball with a diameter of 25 mm and a weight of 66.8 g dropped from a height of 1 m. The diameter of the region of failure of the polymeric film at the point of impact is measured manually. This test is carried out on test specimens which have been subjected to a cathodic electrocoating stage, namely maintenance at 175° C. for 30 min.

The failure of the film must be limited to a very reduced region, typically with a diameter of 1-2 mm.

During the extrusion tests on the polymeric blend, care is also taken that the extrusion takes place without die deposition, that is to say without formation of agglomerates on the lips of the extruder. The blends in which materials deposited in the die are entrained are discarded due to the nonhomogeneity of the polymeric film formed.

During the colamination tests on the polymeric film, care is also taken that the film can be colaminated at rates greater than 50 m/min in order for the manufacture of the composite part to be compatible with the galvanizing and coating lines.

The compatibility of the polymeric face of the composite part with the adhesives and mastics of the motor vehicle sector is evaluated by means of a tensile test on a test specimen formed of a strip of the composite part according to the invention and of a strip of bare metal, the two strips being adhesively bonded over a portion of their surface by means of adhesives and mastic representative of those used in the motor vehicle sector. The adhesives selected for carrying out the test are the references BM1496V® (epoxy-based structural adhesive sold by Dow), RB10BV® (rubber-based semistructural adhesive sold by Revocoat) and Terostat 1159® (adjusting mastic sold by Henkel). The maximum stress obtained during the tensile test is compared to a reference composed of two strips made of bare metal. The result must not deviate by more than 30% from the reference.

EXAMPLES

The characteristics of a few composite parts formed and the properties obtained are summarized in table 1. PP1 and PP2 are two isotactic polypropylenes which differ in their gel content. They are sold by Total Petrochemicals under the references PPC3650 and PPC3666 respectively and already incorporate EPR.

It is found that only the composite parts according to the invention exhibit the desired technical characteristics. This is because:

in the absence of reinforcing fillers (tests nos 5 and 6), the polymeric film exhibits an insufficient Young's modulus at 20° C. and can exhibit significant shrinkage in the shrinkage test on a small cup, in the presence of high levels of fillers (tests nos 7 and 8), deposition in the die and a poor impact strength at −40° C. are observed in particular, if the percentage of the first antioxidant is less than 0.2% (test no. 9), the polymeric film creeps in the creep test.

The results of compatibilization with the adhesives and the mastics of the motor vehicle sector obtained with an adhesive layer coextruded with the polymeric blend according to the invention are summarized in table 2.

TABLE 1

| Test No. | 1* | 2* | 3* | 4* | 5 |
|---|---|---|---|---|---|
| Nature of the matrix | PP1 | PP1 | PP2 | PP1 | PP1 |
| Nature of the elastomer | EPR | EPR | EPR | EPR | EPR |
| % elastomer in the PP matrix | 14% | 14% | 16% | 17% | 17% |
| Nature of the fillers | μtalc | μtalc | μtalc | μtalc | NO |
| % of fillers | 7% | 8% | 7% | 7% | 0% |
| 1st antioxidant | Ethanox ® | Ethanox ® | Ethanox ® | Ethanox ® | Ethanox ® |
| % 1st antioxidant | 0.2% | 0.2% | 0.2% | 0.2% | 0.2% |
| 2nd antioxidant | Ethaphos ® | Ethaphos ® | Ethaphos ® | Ethaphos ® | Ethaphos ® |
| % 2nd antioxidant | 0.1% | 0.1% | 0.1% | 0.1% | 0.1% |

TABLE 1-continued

| | | | | | |
|---|---|---|---|---|---|
| Colamination rate | 110 m/min | 130 m/min | NE | NE | NE |
| Die deposition | NO | NO | NO | NO | NO |
| Film thickness (μm) | 300 | 300 | 300 | 300 | 300 |
| Film width (mm) | 1400 | 1300 | 300 | 300 | 300 |
| Peel strength (daN/cm) | 5.24 | 2.2 | 5.23 | 3.61 | 5.54 |
| Peel strength after electrocoating (daN/cm) | NE | NE | 3.81 | 3.74 | 3.81 |
| E (MPa) Long. direction/ Transverse direction | 1200 1300 | 2313 2417 | 1200 1400 | 1198 1000 | 820 830 |
| Elongation (%) Long. direction/ Transverse direction | 1100 900 | 1276 1237 | 840 880 | 795 540 | 950 1100 |
| Shrinkage on small cup (mm) | 0 | 1 | 0 | 0 | 0 |
| Creep | NO | NO | NO | NO | NO |
| Impact strength at −40° C. (mm) | 1.1 | NE | 1 | 1.1 | 0 |

| Test No. | 6 | 7 | 8 | 9 |
|---|---|---|---|---|
| Nature of the matrix | PP2 | PP1 | PP1 | PP1 |
| Nature of the elastomer | EPR | EPR | EPR | EPR |
| % elastomer in the PP matrix | 16% | 13% | 13% | 14% |
| Nature of the fillers | NO | CaCO₃ | CaCO₃ | μtalc |
| % of fillers | 0% | 23% | 34% | 7% |
| 1st antioxidant | Ethanox ® | Ethanox ® | Ethanox ® | Ethanox ® |
| % 1st antioxidant | 0.2% | 0.2% | 0.2% | 0.1% |
| 2nd antioxidant | Ethaphos ® | Ethaphos ® | Ethaphos ® | Ethaphos ® |
| % 2nd antioxidant | 0.1% | 0.1% | 0.1% | 0.1% |
| Colamination rate | NE | 130 m/min | NE | 130 m/min |
| Die deposition | NO | YES | NE | NO |
| Film thickness (μm) | 300 | 300 | 300 | 300 |
| Film width (mm) | 300 | NE | NE | 1300 |
| Peel strength (daN/cm) | 5.03 | NE | NE | NE |
| Peel strength after electrocoating (daN/cm) | 4.29 | NE | NE | NE |
| E (MPa) Long. direction/ Transverse direction | 960 870 | NE NE | NE NE | NE NE |
| Elongation (%) Long. direction/ Transverse direction | 1000 1000 | NE NE | NE NE | NE NE |
| Shrinkage on small cup (mm) | 9 | NE | NE | NE |
| Creep | NO | NE | NE | YES |
| Impact strength at −40° C. (mm) | 0 | NE | 9 | NE |

(*= composite part according to the invention;
NE = not evaluated)

TABLE 2

| Test No. | | 1 | 2* |
|---|---|---|---|
| Nature of the adherent layer | | Reference | Priex ® 25050 |
| Maximum stress (MPa) with the following adhesives and mastics | BM1496V ® | 21.5 | 17.5 |
| | RB10BV ® | 11.7 | 14.2 |
| | Terostat 1159 ® | 0.5 | 0.5 |

(*= composite part according to the invention;
NE = not evaluated)

The invention claimed is:

1. A composite part, comprising a sheet of steel coated with a polymeric film formed beforehand by extrusion of a polymeric blend comprising:
   (a) a polymer formed from a dispersion of elastomer nodules in a polypropylene matrix, wherein a proportion of elastomer in the matrix is less than 20% by weight of a combination formed by the matrix and the elastomer;
   (b) a first antioxidant from the family of phenolic antioxidants in a content by weight of greater than or equal to 0.2%;
   (c) a second antioxidant from the family of hydroperoxide-decomposing antioxidants in a content by weight of greater than or equal to 0.1%; and
   (d) a reinforcing filler in a content by weight of less than 10%.

2. The composite part of claim 1, wherein the proportion of the elastomer in the matrix is between 8 and 20% by weight of the combination formed by the matrix and the elastomer.

3. The composite part of claim 1, wherein the first antioxidant (b) is present in the polymeric blend in a content by weight of 0.2%, and the second antioxidant (c) is present in the polymeric blend in a content by weight of 0.1%.

4. The composite part of claim 1, wherein the reinforcing filler (d) is microtalc.

5. The composite part of claim 1, further comprising a polymeric layer of functionalized polyolefin between the sheet of steel and the polymeric film.

6. The composite part of claim 1, comprising, between the sheet of steel and the polymeric film, an adhesive layer comprising a polyolefin functionalized by means of polar functional groups.

7. The composite part of claim 1, further comprising, between the sheet of steel and the polymeric film, a primer applied to the sheet of steel, an adhesive applied to the primer, or both.

8. The composite part of claim 1, further comprising, between the sheet of steel and the polymeric film, a primer applied to the sheet of steel, and an adhesive applied to the primer.

9. The composite part of claim 1, wherein the elastomer is an EPR (ethylene/propylene rubber).

10. The composite part of claim 1, wherein the polymer is adapted to withstand a cathodic electrocoating at a temperature of between 150° C. and 210° C. for about 30 minutes without a delamination between the sheet of steel and the polymeric film.

11. The composite part of claim 1, wherein the matrix comprises an isotactic polypropylene with a weight-average molar weight of approximately 400,000 g/mol and with a melt flow index of approximately 2.

12. A process for the manufacture of the composite part of claim 1, the process comprising an extrusion of the polymeric blend in the form of a film and one colamination of the polymeric film obtained on the sheet of steel.

13. The process of claim 12, wherein the polymeric blend is coextruded with a polymeric layer of functionalized polyolefin such that the composite part further comprises the polymeric layer of functionalized polyolefin between the sheet of steel and the polymeric film.

14. A motor vehicle component, comprising the composite part of claim 1.

15. The component of claim 14, wherein the composite part is shaped by embossing, stamping, hydroforming or forming.

16. A process for manufacturing the component of claim 14, the process comprising forming the composite part by overmolding.

17. A composite part comprising a sheet of steel coated with a polymeric film, the polymeric film comprising
(a) nodules of an elastomer dispersed in a matrix comprising one polypropylene having a melt flow index of approximately 2, wherein the elastomer comprises an EPR (ethylene/propylene rubber) or an EPDM (ethylene/propylene/diene termopolymer) in a content by weight of between 8% to 20%;
(b) a first antioxidant from the family of phenolic antioxidants in a content by weight of greater than or equal to 0.2%;
(c) a second antioxidant from the family of hydroperoxide-decomposing antioxidants in a content by weight of greater than or equal to 0.1%; and
(d) a reinforcing filler in a content by weight of less than 10%;
wherein the polymeric film is formed by extrusion of a polymeric blend comprising the polypropylene, the elastomer, the first antioxidant, the second antioxidant, and the reinforcing filler.

18. The composite part of claim 17, wherein the reinforcing filler is microtalc, and the polymeric film comprises between 2 and 9% of the microtalc in the content by weight.

* * * * *